United States Patent
Smith (10) Patent No.: US 6,851,452 B2
(45) Date of Patent: Feb. 8, 2005

(54) GUIDE PLATE

(75) Inventor: Brian Smith, Woodsetts Worksop (GB)

(73) Assignee: General Signal UK Limited, Stockport (GB)

(*) Notice: Subject to any disclaimer, the term of this patent is extended or adjusted under 35 U.S.C. 154(b) by 27 days.

(21) Appl. No.: 10/335,852

(22) Filed: Jan. 3, 2003

(65) Prior Publication Data

US 2004/0129326 A1 Jul. 8, 2004

(51) Int. Cl.[7] .............................................. F16L 55/10
(52) U.S. Cl. ............................ 138/89; 138/90; 138/92; 220/300; 220/327
(58) Field of Search .......................... 138/89, 90, 92, 138/94; 220/241, 300, 327, 849

(56) References Cited

U.S. PATENT DOCUMENTS

| | | | | | |
|---|---|---|---|---|---|
| 2,078,003 A | * | 4/1937 | Klein | ........................... | 220/325 |
| 2,743,034 A | * | 4/1956 | Wheatley | ..................... | 220/327 |
| 2,869,752 A | * | 1/1959 | Hall | ........................... | 220/298 |
| 2,870,934 A | * | 1/1959 | Hill | ........................... | 220/263 |
| 3,435,794 A | * | 4/1969 | Pechacek | ..................... | 114/312 |
| 3,694,145 A | * | 9/1972 | Stevens | ........................ | 49/318 |
| 3,897,609 A | * | 8/1975 | Schmidt, Jr. | ................. | 452/43 |
| 4,044,918 A | * | 8/1977 | Alton | ........................ | 220/314 |
| 4,237,936 A | * | 12/1980 | Lollis et al. | .................. | 138/90 |
| 4,239,602 A | * | 12/1980 | La Bate | ....................... | 202/242 |
| 4,307,818 A | * | 12/1981 | Singh et al. | ................. | 220/316 |
| 4,361,252 A | * | 11/1982 | Black et al. | ................. | 220/830 |
| 4,519,519 A | * | 5/1985 | Meuschke et al. | .......... | 220/211 |
| 5,143,389 A | * | 9/1992 | Jonkers | .................... | 280/47.26 |
| 5,329,971 A | * | 7/1994 | Condon | ........................ | 138/89 |
| 6,742,957 B2 | * | 6/2004 | Smith et al. | ................. | 403/321 |
| 2004/0118849 A1 | * | 6/2004 | Rosaen | ........................ | 220/291 |

* cited by examiner

Primary Examiner—James Hook
(74) Attorney, Agent, or Firm—Baker & Hostetler LLP

(57) ABSTRACT

A guide plate for a lug type closure arrangement is provided with a stepped profile to aid a user move the head of the closure arrangement relative to the hub from a locked to an unlocked position. A marker pin is provided to align with the guide plate at various stages in the unlocking sequence. The relative positions of the marker pin and the guide plate indicate to the user the relative positions of the lugs on the head and the lugs on the hub.

22 Claims, 6 Drawing Sheets

GUIDE PLATE

FIELD OF THE INVENTION

The present invention relates to a guide plate for a closure arrangement. More particularly the present invention relates to a guide plate for a lug type closure arrangement and a method of aiding a user open and close such a closure arrangement.

BACKGROUND OF THE INVENTION

Pipelines and pressure vessels that generally operate under high pressure are very common in industry. Such pipelines and pressure vessels are used to transport or store a large variety of pressurised gasses and fluids. Closure arrangements are commonly used to provide quick access to the interior of such fluid or gas handling systems. Before accessing these systems via a closure arrangement, it is generally known to depressurize the system by means of a main bleed valve.

Closure arrangements often comprise a flange formed around an opening at the end of a hub-shaped extension that extends from some part, such as a pipe, of the fluid or gas handling system. A covering or closing element, which forms a cap, referred for the purposes of this document at as a "head", is securely attached over the flanged opening to provide a fluid-tight and pressure-tight seal when the closure arrangement is closed. The head is removable to provide access to the interior of the pressurized system via the opening in the flange of the hub.

The head can be secured onto the flanged opening of the hub by a variety of different ways. One way is simply to provide a series of corresponding bolt holes through the head and around the circumference of the flange so that individual bolts may be inserted through the corresponding holes and tightened. A gasket is provided between the head and the flange, and tightening of the bolts causes the circumference of the head to be pressed against the flange. Fully tightening all the bolts provides sufficient closing pressure to provide a seal at the gasket that is sufficient to prevent the escape of the pressurized fluid or gas. However, a disadvantage of such bolt type closures is the installation and removal of the individual bolts can be time consuming. This is particularly the case when there are a large number of bolts to install or remove.

Another common type of closure is often referred to as a screw type closure. In such closure arrangements the flange is provided with a threaded outer surface, and the head is provided with a corresponding threaded inner surface. To seal the closure arrangement, the head is screwed onto the flange. However, a disadvantage of screw type closures is that the head may be required to be rotated around several rotations in order to be screwed onto the flange. For large closure arrangements, the head can be very heavy, and therefore it can be very difficult for a user to screw the head onto or off the flange.

Figure 1:
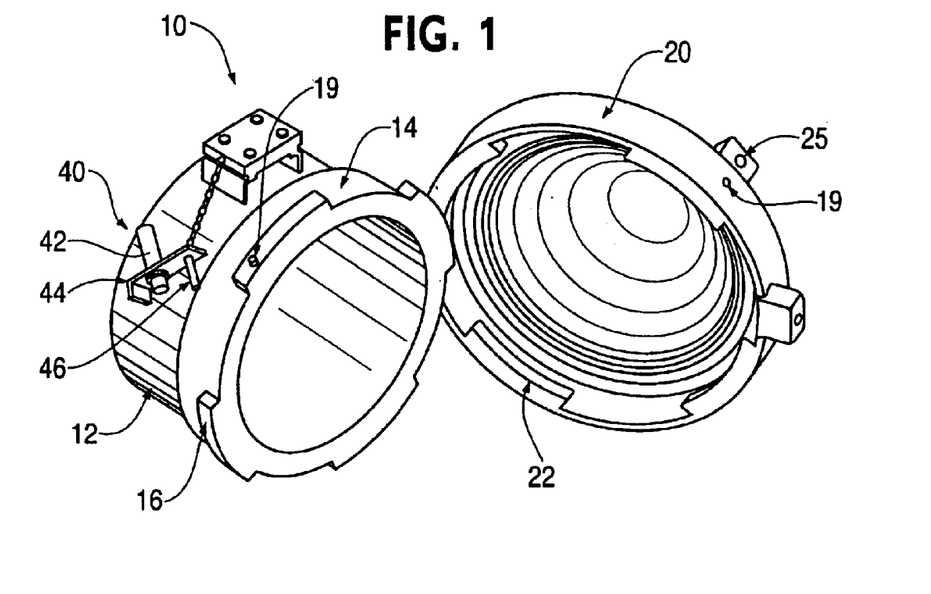
FIG. 1 shows a known lug type closure arrangement.

Another type of closure is a lug type closure. An example of a lug type closure arrangement 10 is shown in FIG. 1. This prior art closure is an early closure from GD Engineering.

The closure arrangement 10 comprises a hub 12 that is adapted to fit over a part, such as a pipe, of a fluid handling system. At the outer end of the hub 12 is a radially outwardly extending flange 14. The flange 14 is provided with four lugs 16 that project outwardly from the flange 14. The closure arrangement 10 also comprises a head 20 that is adapted to fit over the flange 14 of the hub 12. The head comprises four inwardly projecting lugs 22 that correspond in size to the lugs 16 on the flange 14.

In addition the closure arrangement 10 comprises a pressure release device 40. The pressure release device 40 comprises a pressure release screw 42 that is rotatably connected to a deflector plate 44. Attached to the deflector plate 44 is a locking pin 46 projecting from the deflector plate 44 in a direction parallel to the pressure release screw 42.

The pressure release screw 42 is adapted to be received in a vent bore 25 extending from the outside of the head 20 inside the closure arrangement 10. The locking pin 46 is adapted to be received in a locking bore 29 on the head 20 and a corresponding locking bore 19 on one of the lugs 16 on the flange 14. The locking bore 29 extends through the head 20 and is aligned with the locking bore on one of the lugs 16 on the flange 14 when the closure arrangement 10 is in a closed position. The locking bore 19 on the flange 14 extends partially into the lug 16.

To close the closure arrangement 10 the head 20 is oriented such that the lugs 22 on the head are at different angular positions to the lugs 16 on the flange. The head 20 is then pushed axially onto the flange 14 without the lugs 22 on the head 20 interfering with the lugs 16 on the flange 14. Once the lugs 22 of the head 20 have been pushed past the lugs 16 of the flange 14 in the inner axial direction, the head 20 is rotated around a predetermined angle such that the lugs 22 are located behind the lugs 16 of the flange 14. The lugs 16 of the flange 14 will then prevent axial moment of the head 20 in the outer direction, and the head 20 is thus held pressure-tight against the flange 14.

Once the head 20 is in the closed position the pressure release 40 device is used to lock the closure arrangement 10. To lock the closure arrangement 10 the user installs the pressure release device 40 onto the closure arrangement 10. The user aligns the pressure release screw 42 with the vent bore 25 and the locking pin with the locking bore 29 on the head 20. The user then tightens the pressure release screw 42, which will urge the entire pressure release 40 device towards the head 20. The pressure release screw 42 will seal the vent bore 25, and provide a pressure tight seal. Furthermore the pin 46 will extend through the bore 29 on the head and into the bore 19 on the flange. The pin 46 will thus prevent rotation of the head 20 and opening of closure arrangement 10 until the pressure warning release screw 42 is released. Thus, the closure arrangement 10 will be in a locked state and the closure arrangement 10 cannot be opened until the pressure release screw 42 is unscrewed.

Lug type closure arrangements 10 of this type are preferable to screw type closure arrangements as the head can be moved from an open position to a closed position by rotating the head through a partial turn, e.g. 45°. For large closure arrangements, this can greatly increase the ease of opening and closing of the closure arrangement.

When in a closed position, the lugs provided on the head 20 and the flange 14 are disposed opposite each other and internal the closure arrangement 10. They are therefore are obscured from the view of the user by the head 20 and the flange 14, and it may be difficult for the user to appreciate how far the head 20 needs to be rotated before is can be moved axially off the flange 14.

In order to open the head 20, it is first necessary to unlock the closure arrangement 10. Unscrewing the pressure release screw 42 so that the pin 46 clears at least the bore 19 on the flange, release the seal between the pressure release screw 42 and the vent bore 25. If there is considerable internal pressure the user will be warned in the form of noticeable escaping gas or fluid. Opening the vent bore 25 will vent any fluids or gas that are under residual pressure inside the system near the closure arrangement 10. The user can then remove the pressure release device 40 from the head 20, permitting the rotation of the head 20 relative to the hub 12. The vent bore 25 is not used for venting the pressure in the system, but merely as a safety device to warn of the presence of pressure in the system. It can also vent any small residual pressure to ensure pressure equalization across the closure before opening.

On opening the closure arrangement 10, and once the pressure release device 40 has been removed, the head 20 is rotated relative to the hub 12 to a position at which the lugs 22 provided on the head 20 are not aligned with the lugs 16 provided on the flange 14. As both sets of lugs are not visible to the user, it can be difficult to align the lugs in such a way, and the user can therefore struggle to align the lugs and remove the head 20 from the flange 14.

Figure 2:
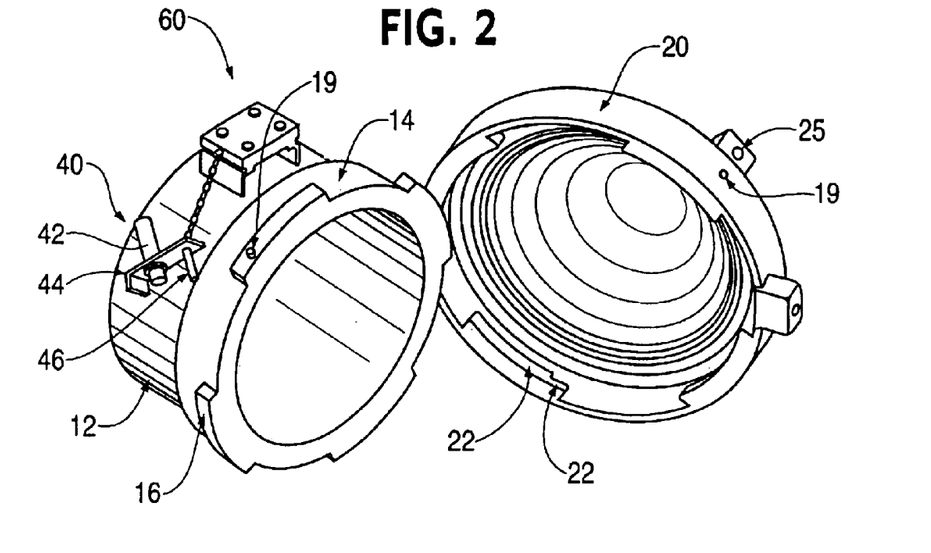
FIG. 2 shows a further known lug type closure arrangement.

FIG. 2 shows another example of a lug type closure arrangement 50 by GD Engineering. The closure arrangement 60 is substantially similar to the closure arrangement 10 shown in FIG. 1 except that it is provided with a stepped lug 24 adjacent each lug 22 of the head 20, and also that a stop pin 18 provided on the flange 14.

The closure arrangement 60 shown in FIG. 2 is closed in the same way as the closure arrangement 10 of FIG. 1. The head 20 is first pushed axially onto the flange 14, and then rotated relative to the flange 14 such that the lugs 22 on the head 20 are located behind the lugs 16 on the flange 14. The pressure release device 40 is then installed to lock the closure arrangement 60.

However, the closure arrangement 60 is opened in a different way to the closure arrangement 10 shown in FIG. 1. To open the closure arrangement 60 the pressure release device 40 is first removed, and then the head 20 is rotated relative to the flange 14 until one of the lugs 22 contacts the stop pin 18. The stop pin 18 is located such that when the lugs 22 are rotated to contact it, the lugs 22 are no longer located behind a corresponding lug 16, but each of the stepped lugs 24 is still located behind a corresponding lug 16.

If there is sufficient residual pressure in the fluid handling system the head 20 will then be urged axially in an outward direction until the stepped lugs 24 contact the lugs 16. The head 20 will therefore have been partially pushed off the flange 14 by the pressure of the system. The residual pressure can then therefore be safely vented without the pressure causing the head 20 to fly off the flange 14. If the pressure inside the system is not sufficient to urge the head 20 outwards such that the stepped lugs 24 contact the lugs 16 on the flange 14, the head 20 can be moved manually sufficiently outwards.

The user then rotates the head 20 until the lugs 24 are no longer located behind the lugs 16. At this point the head 20 can be moved off the flange 14 without any of the lugs interfering with each other.

FIGS. 1 and 2 show closure arrangements that only comprise a head 20 and a hub 12. However, as discussed closure arrangements for fluid handling systems can be very large, and therefore the heads 20 of such closure arrangements can be extremely heavy. For large closure arrangements, mechanical actuating means may be required both to rotate the head 20 relative to the flange 14 and remove it from the hub 12. The lugs on both the head 20 and the hub 12, as well as the stop pin 18 are not visible to the user from the outside of the closure arrangement 10 when it is in a closed position. Therefore, it is possible the user will forcibly rotate the head 20 too far relative to the hub 12, causing a lug 22 to forcibly impinge on the stop pin 18, potentially damaging both the stop pin 18 and the lug 22.

Similarly, if the lugs 22, 24 on the head 20 are not properly aligned relative to the lugs 16 on the flange 14 before axial force is applied to the head 20 to urge it from the flange 14, the lugs 22, 24 will be forced against the lugs 16 on the flange 14. Applying a large amount of force to both sets of the lugs in this way, particularly if powerful mechanical actuating means are used, could lead to deformation and damage of the lugs.

Lug type closure arrangements can also comprise support means such as davit arms to support the head 20 when it is removed from the hub 12. Other configurations of lug type arrangements are possible, but lug type closures all relying on a sequence of rotational and translation movements of the head 20 relative to the hub 12, and are all associated with the problems of the sort encountered with the arrangements of FIGS. 1 and 2.

It is an object of the invention to mitigate the above problems associated with lug type closure arrangements.

SUMMARY OF THE INVENTION

According to a first aspect of the invention there is provided a lug type closure arrangement comprising a hub, a head adapted to be disengageable from said hub in a locked position to an unlocked position by a sequence of relative rotational and translational movements, and a guide device to aid a user perform said sequence of relative rotational and translation movements.

In a one embodiment said guide device comprises a guide plate attached to said hub or said head. The guide plate can comprise a stepped profile.

In an embodiment said guide plate is attached to said hub and associated with a marker on said head, wherein said marker is adapted to align with predetermined positions of said guide plate at predetermined stages in said sequence of relative rotational and translational movements. The marker can comprise a radially outwardly projecting pin.

In an embodiment said guide plate is attached to said head and is associated with a marker on said hub, wherein said marker is adapted to align with predetermined positions of said guide plate at predetermined stages in said sequence of relative rotational and translational movements. The marker can comprise a radially outwardly projecting pin.

According to a second aspect of the invention there is provided a method of opening a closure arrangement, the closure arrangement comprising a hub and a head adapted to be rotatable relative to the hub, the method comprising providing a guide device to guide a user to perform a sequence of relative rotational and translation movements in order move the head from a locked to an unlocked position.

In one embodiment said guide device is provided as a guide plate attached to said hub or sad head. The method can further comprise providing said guide plate with a stepped profile.

In one embodiment said guide plate is provided on said hub, the method further comprising providing a marker on said head, and aligning said marker with predetermined positions of said guide plate at predetermined stages in said sequence of relative rotational and translational movements. The method can comprise using a radially outwardly projecting pin as said marker.

In an embodiment said guide plate is provided on said head, the method further comprising providing a marker on said hub, and aligning said marker with predetermined positions of said guide plate at predetermined stages in said sequence of relative rotational and translational movements. The method can comprise using a radially outwardly projecting pin as said marker.

According to a third aspect of the invention there is provided a closure arrangement comprising: a hub comprising at least one first type of lug projecting from the hub; a head adapted to be rotatable relative to said hub, the said head comprising at least one stepped second type of lug and at least one third type of lug projecting from said head, wherein the or each stepped second type of lug is situated adjacent a single third type of lug, wherein the or each stepped second type of lug is arranged to provide a stepped profile relative to the adjacent third type of lug, wherein said head is arranged to be in a first position when the or each stepped second type of lug and the or each third type of lug are arranged so as to not interfere with a corresponding first type of lug, wherein said head is arranged to be in a second position when the or each stepped second type of lug at least partially overlaps in an axially direction with a corresponding first type of lug, wherein said head is arranged to be in a third position when the or each stepped second type of lug contacts a corresponding first type of lug, and wherein said head is arranged to be in a fourth position when the or each stepped second type of lug and the or each third type of lug are arranged so as to at least partially overlap in an axial direction with a corresponding first type of lug; a marker; and a guide plate having a stepped profile, wherein said marker and said guide plate are adapted to aid a user perform a sequence of relative rotational and translation movements that is required to move said head from the fourth position to the first position via the third and second positions.

In a preferred embodiment said guide plate comprises a first portion, a stepped second portion, and a third portion. Preferably said marker is adapted to contact said first portion of said guide plate when the closure arrangement is in the third position, wherein said marker is adapted to be located just above said stepped second portion of said guide plate when the closure arrangement is in the second position, and wherein said marker is adapted to contact said second portion of said guide plate when the closure arrangement is in the first position In a preferred embodiment said guide plate is attached to said hub. Preferably said marker comprises a radially outwardly projecting pin attached to said head.

In a preferred embodiment said guide plate is attached to said head. Preferably said marker comprises a radially outwardly projecting pin attached to said hub.

According to a fourth aspect of the invention there is provided a method of opening a closure arrangement according to the third aspect of the invention, comprising; rotating said head relative to said hub until there is contact between said marker and a first portion of said guide plate; moving said head in an outer axial direction relative to said hub until said marker is located just away from a second stepped portion of said guide plate; rotating said head relative to said hub until there is contact between said marker and a third portion of said guide plate; and moving said head in the outer axial direction relative to said hub until said head is separated from said hub.

According to a fifth aspect of the invention there is provided a lug type closure arrangement comprising a hub, a head adapted to be disengageable from said hub in a locked position to an unlocked position by a sequence of relative rotational and translational movements, and a guide means for aiding a user perform said sequence of relative rotational and translation movements.

BRIEF DESCRIPTION OF THE DRAWINGS

Embodiments of the invention will now be described, by way of example, and with reference to the accompanying drawings, in which.

DESCRIPTION OF EMBODIMENTS OF THE INVENTION

Figure 3:
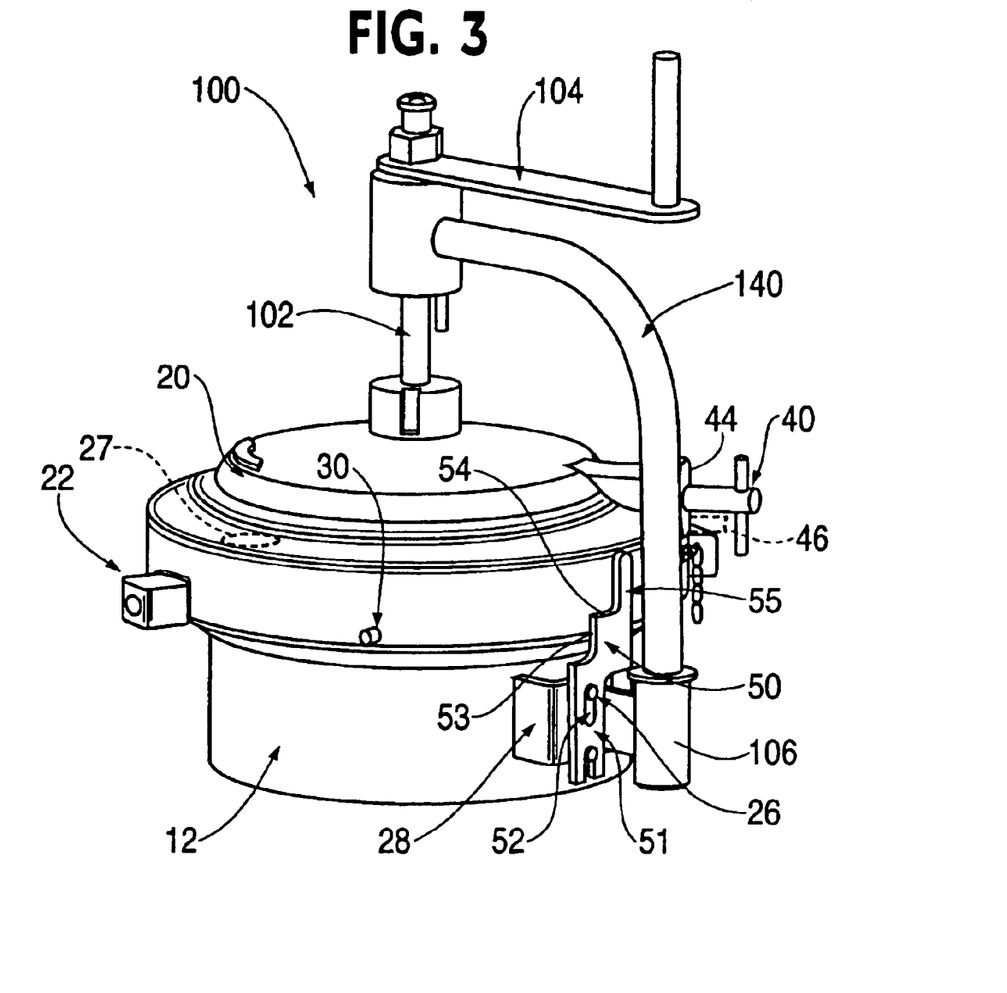
FIG. 3 shows a vertical lug type closure arrangement employing a guide plate according to a first embodiment of the invention.

FIG. 3 shows a closure arrangement 100 of a first embodiment of the invention comprising a head 20, a hub 12, a pressure release device 40, an actuating means for lifting the head 20 vertically, and a means for supporting the head 20 when it is not on the hub 12. The closure arrangement 100 further comprises a marker pin 30 and a guide plate 50.

The head 20 and hub 12 are generally similar to those illustrated in FIG. 2. The head 20 comprises a set of four lugs 22 and a set of four stepped lugs 24, and the hub 12 comprises a flange 14 with a set of four lugs 16. The head also comprises two diametrically opposite handles 27, which aid the user rotate the head 20 relative to the hub 12. The pressure release device 40 comprises a pressure release screw 42 that is rotatably connected to a deflector plate 44. Attached to the deflector plate 44 is a locking pin 46 projecting from the deflector plate 44 in a direction parallel to the pressure release screw 42.

The support means comprises a hinged davit arm 140 that is rotatably connected at its bottom end to a hinged bore 106. The hinged bore 106 is attached to a connecting portion 28 of the hub 12. The davit arm 140 extends in an upward direction from the bore 106 and is connected at its upper end to a screw thread 102. The screw thread 102 is connected to the head 20 and to a rotatable handle 104. Rotating the handle 104 lifts or lowers the head 20 on the screw thread 102 in a vertical direction, and thus the user is not required to lift the head 20 manually. When the head 20 is free from the flange 14, the head 20 can be moved to one side of the hub 12 by rotating the davit arm 140 about the hinge bore 106. This allows the user to access to the inside of the fluid handling system to which the hub 12 is attached.

The marker pin 30 is attached to the head 20, and comprises a radially outwardly projecting pin. The guide plate 50 comprises a base portion 51 having two screw holes 52, and is attached to the connecting portion 28 of the hub 12 by two screws 26 threaded through the screw holes 52.

Extending from the base portion 51 of the guide plate 50 is a first pin contact portion 53. The guide plate 50 further comprises a stepped portion 54 and a second pin contact portion 55. The portions 53, 54 and 55 are arranged to provide the guide plate 50 with a stepped profile.

As discussed, the head 20 and hub 12 of the closure arrangement 100 shown in FIG. 3 have substantially the same internal configuration of lugs as the closure arrangement 60 shown in FIG. 2. Therefore, after venting the pressure by removing the pressure release device 40, the same series of relative rotational and translational movements of the head 20 will be needed in order to open the closure arrangement 100 as that described above in relation to the closure arrangement 60 shown in FIG. 2. The rotational movements of the head 20 relative to the hub 12 are facilitated the handles 27 comprised on the head 20, and the translational movements of the head 20 are facilitated by the handle 140.

Figure 4:
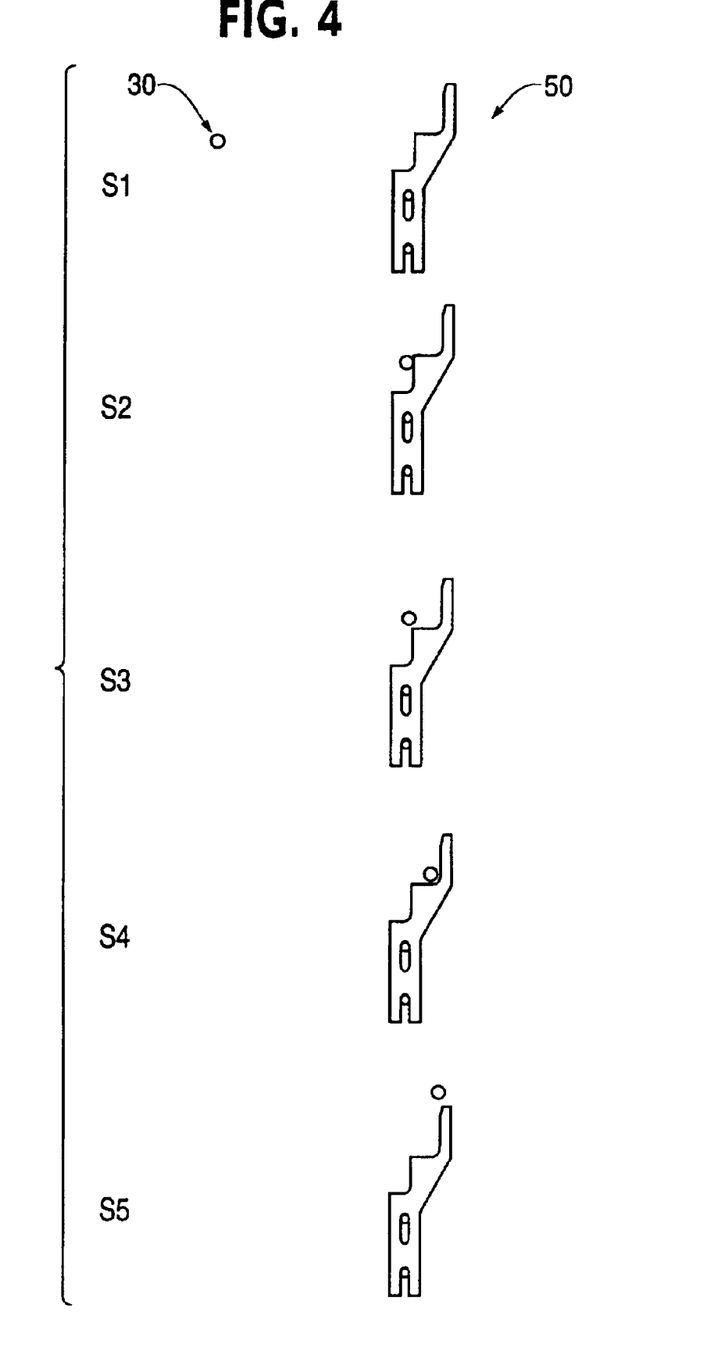
FIG. 4 is a schematic illustration of the relative positions of the guide plate and marker pin at different stages as the closure arrangement of FIG. 3 is opened.

The marker pin 30 and guide plate 50 are positioned in order to act as a visual guide to help the user remove the head 20 from flange 14 without damaging either the lugs or the stop pin 18. FIG. 4 schematically illustrates the positions of the marker pin 30 relative to the guide plate 50 at various stages as the closure arrangement 100 is opened.

At stage S1 the closure arrangement 100 is in the closed position, and the marker pin 30 is located away from the guide plate 50. In the closed position, the lugs 22, 24 on the head 20 are aligned to interfere with a corresponding lug 16 on the hub 12.

To open the closure arrangement 100, the user first removes the pressure release device 40 from the head to unlock the closure arrangement 100. Then the user grips the handles 27 and rotates the head 20 in the direction that brings the marker pin 30 closer to the guide plate 50.

At stage S2, the marker pin 30 contacts the first pin contact portion 53 of the guide plate 50. At this point the lugs 22 on the head 20 have been are rotated so that they are no longer aligned to interfere with a corresponding lug 16 on the hub 12, but each of the stepped lugs 24 is still located behind a corresponding lug 16. At this stage a lug 22 will have contacted the stop pin 18 on the flange 14.

In this embodiment, the handle 104 is then rotated to lift the head 20 vertically until the marker pin 30 is located just above the stepped portion 54 of the guide plate 50 (stage S3). At this stage, the lugs 24 will contact the lugs 16, preventing further axial movement of the head 20 in an outer (vertical) direction. Any residual internal pressure of the fluid handling system can then therefore be safely vented at this stage.

The user then rotates the head 20 until the marker pin 30 reaches the second pin contact portion 55 of the guide plate (stage S4). At this point, the stepped lugs 24 of the head are no longer located behind the lugs 16 of the hub 12. The user can then rotate the handle 104 in order to raise the head 20 off the flange 14 (stage S5). The head 20 will then be completely free of the flange 14 and can be rotated to one side of the hub 12 about the hinge bore 106.

The guide plate 50 helps prevent the user from rotating the head 20 too far such that a lug 22 damages the stop pin 18, as the position of the marker pin 30 relative to the guide plate 50 at stage S2 indicate to the user that a sufficient rotation of the head 20 has taken place.

The guide plate 50 also helps prevent the user from rotating the handle 104, and thus urging the head 20 vertically away from the flange 14, when the lugs 22, 24 on the head 20 are not properly aligned with the lugs 16 on the flange 14. The guide plate 50 therefore helps prevents the user from damaging the lugs by forcibly urging them against each other by the action of the actuating means.

The vertical position of the guide plate 50 is adjusted by the use of the screw holes 52, which allow the guide plate 50 to be fitted at a range of vertical positions on the connecting portion 28. The relative positions of the marker pin 30 and guide plate 50 are adjusted to suit the dimensions of the head 20 and the hub 12, as well as the number and configuration of the lugs on both the head 20 and the flange 14

Figure 5:
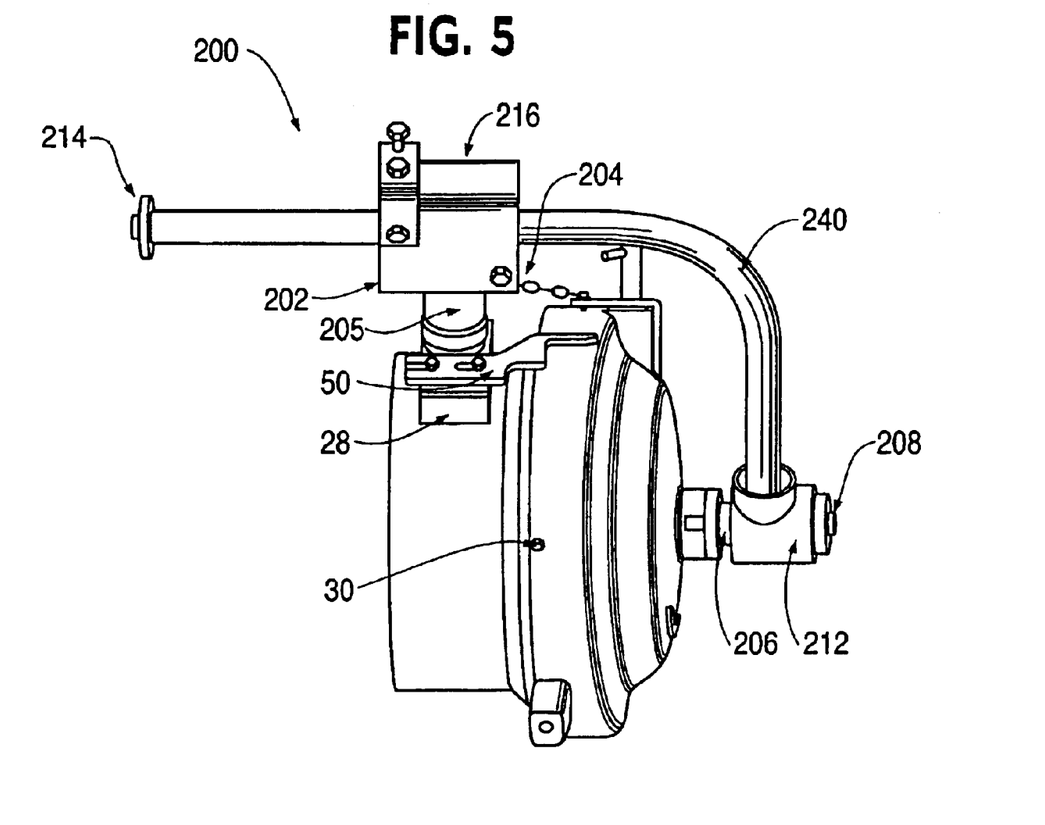
FIG. 5 shows a horizontal lug type closure arrangement according to a second embodiment of the invention.

FIG. 5 is a view of a horizontally orientated closure arrangement 200 of a second embodiment of the invention. The closure arrangement 200 comprises a head 20, a hub 12, a pressure release device 40, and support means for supporting the head 20 when it is not on the hub 12. The closure arrangement further comprises a marker pin 30 and a guide plate 50.

The head 20 and hub 12 are generally similar to those illustrated in FIG. 2. The head 20 comprises a set of four lugs 22 and a set of four stepped lugs 24, and the hub 12 comprises a flange 14 with a set of four lugs 16. The pressure release device 40 comprises a pressure release screw 42 that is rotatably connected to a deflector plate 44. Attached to the deflector plate 44 is a locking pin 46 projecting from the deflector plate 44 in a direction parallel to the pressure release screw 42.

The support means comprises a hinged davit arm 240 that is connected to at one end to a fitting 212 that is journaled to a shaft 206. The shaft 206 is connected to the head 20, and the fitting 212 is kept in place on the shaft 206 by a stop 208. Thus the head 20 can rotate around the shaft 206 relative to the davit arm 240.

The hinged davit arm 240 is mounted in a housing 216. The housing 216 is connected to a connecting portion 28 by a connecting shaft 205. The housing 216 comprises rollers 202 and 204 that allow the davit arm 240 to move relative to the housing 216 in an axial direction and to rotate about its longitudinal axis relative to the housing 216. Thus the head 20, supported by the davit arm 240, can move axially towards and away from the hub 12 and can be rotated about the longitudinal axis of the davit arm 240 away to one side of the hub 12.

A stop 214 is provided at the free end of the davit aim 240 to limit the longitudinal movement of the davit arm 240 and to prevent it from leaving the housing 216.

The marker pin 30 and guide plate 50 have substantially the same shape those of the closure arrangement 100 shown in FIG. 3. In order to open the closure arrangement 200, the same series of rotational and translational movements of the head 20 relative to the hub 12 will be needed as that described above in relation to FIG. 4.

Figure 6:
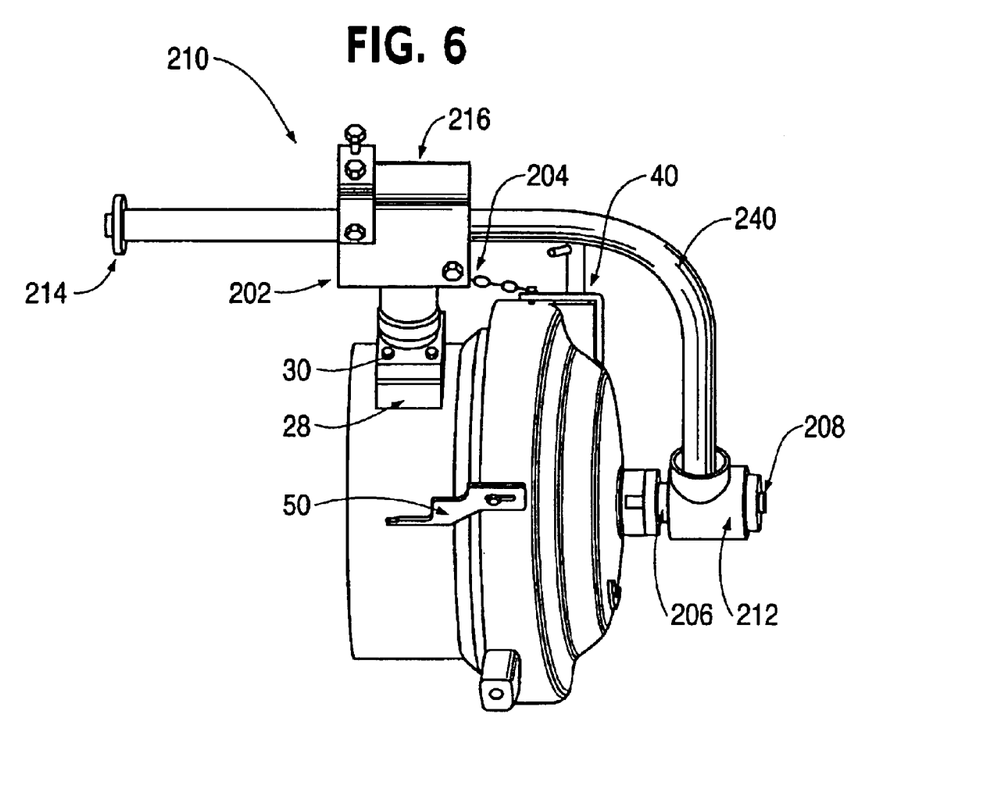
FIG. 6 shows a horizontal lug type closure arrangement according to a third embodiment of the invention.

In all previously described embodiments, the guide plate 50 is connected to the hub 12 and the marker pin 30 is connected to the head 20. FIG. 6 is a view of a horizontally orientated closure arrangement 210 employing an embodiment of the invention, in which the guide plate 50 and marker pin 30 are configured differently. The head 20, hub 12 and supporting means of the closure arrangement 210 are substantially similar to those of the closure arrangement shown in FIG. 5.

In this embodiment, the marker pin 30 comprises a pin projecting radially outwardly from the connecting portion 28 attached to the hub 12. The guide plate 50 comprises a base portion 51 having a screw hole 52, and is attached to the head 20 by a screw 26 threaded through the screw holes 52.

Extending from the base portion 51 of the guide plate 50 is a first pin contact portion 53. The guide plate 50 further comprises a stepped portion 54 and a second pin contact portion 55. The portions 53, 54 and 55 are arranged to provide the guide plate 50 with a stepped profile. In this embodiment, instead of the marker pin 30 moving relative to a stationary guide plate 50 as described in relation to previous embodiments, the guide plate 50 moves relative to the marker pin 30.

Figure 7:
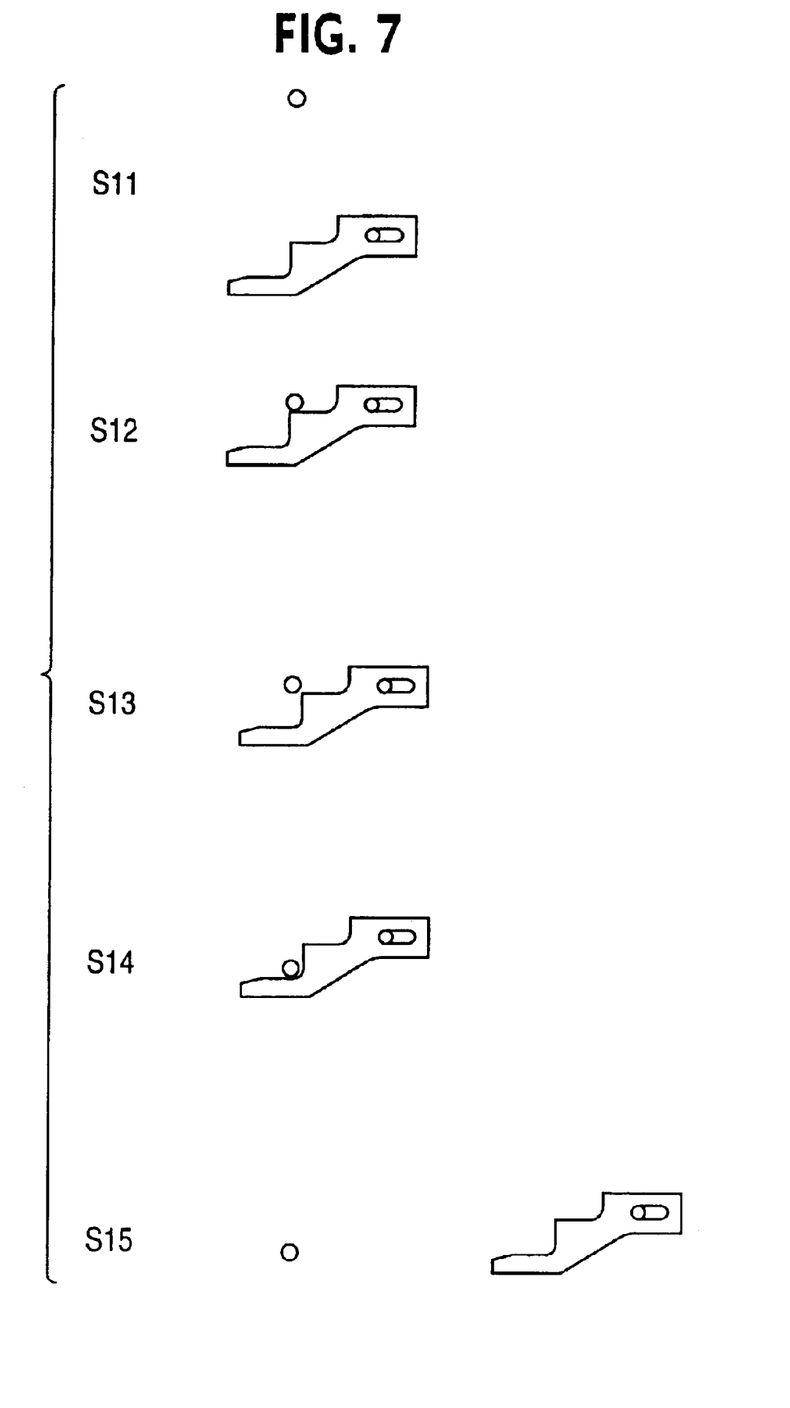
FIG. 7 is a schematic illustration of the relative positions of the guide plate and marker pin at different stages as the closure arrangement of FIG. 5 is opened.

FIG. 7 schematically illustrates the positions of the marker pin 30 relative to the guide plate 50 at various stages as the horizontal closure arrangement 210 is opened.

At stage S11 the closure arrangement 210 is in the closed position, and the guide plate 50 is located away from the marker pin 30. In the closed position, the lugs 22, 24 on the head 20 are aligned to interfere with a corresponding lug 16 on the hub 12.

To open the closure arrangement 210, the user first removes the pressure release device 40 from the head to unlock the closure arrangement 210. Then the user grips the handles 27 and rotates the head 20 in the direction that brings the guide plate 50 closer to the marker pin 30.

At stage S12, the first pin contact portion 53 of the guide plate 50 contacts the marker pin 30. At this point the lugs 22 on the head 20 have been are rotated so that they are no longer aligned to interfere with a corresponding lug 16 on the hub 12, but each of the stepped lugs 24 is still located behind a corresponding lug 16. At this stage a lug 22 will have contacted the stop pin 18 on the flange 14.

The head 20, supported by the davit arm 240, is then moved off the hub 12 in an axially direction until the marker pin 30 is located just above the stepped portion 54 of the guide plate 50 (stage S13). At this stage, the lugs 24 will contact the lugs 16, preventing further axial movement of the head 20 in an outer (horizontal) direction. The internal pressure of the fluid handling system can then therefore be safely vented at this stage.

The user then rotates the head 20 until the second pin contact portion 55 of the guide plate reaches the marker pin 30 (stage S14). At this point, the stepped lugs 24 of the head are no longer located behind the lugs 16 of the hub. The user can then move the head 20 off the flange 14 (stage S15). The head 20 will then be completely free of the flange 14 and can be rotated away from the hub 12 about the longitudinal axis of the davit arm 240.

The horizontal position of the guide plate 50 is adjusted by the use of the screw hole 52, Which allows the guide plate 50 to be fitted at a range of horizontal positions on the head 20. The relative positions of the marker pin 30 and guide plate 50 are adjusted to suit the dimensions of the head 20 and the number and configuration of the lugs on both the head 20 and the flange 14.

The combination of the guide plate 50 and the marker pin 30 in all the described embodiments act as a visual aid to the user and indicate the positions of the lugs 22, 24 on the head 20 relative to the lugs 16 on the flange 14. In the absence of the guide plate 50, the user is unaware of the relative positions of the lugs.

The described embodiments show one stepped shape of the guide plate 50. However, any type or shape of guide device can be used to act as a guide. For example, many other shapes of the guide plate 50 are possible, and different internal lug configurations of the head 20 and flange 14 would require the guide plate 50 to be shaped differently.

For example, a guide plate suitable for the closure arrangement 10 illustrated in FIG. 1 could simply consist of a rectangular plate. This is because the closure arrangement illustrated in FIG. 1 does not comprise stepped lugs on the head 20, and is thus opened it a two, rather than four, stage process. In such an arrangement the head 20 would be simply rotated until it reached a marker pin or similar feature reached the guide plate, and then lifted off the flange 14.

The guide device need not be a plate or planar, and could be a curved arm or rod to act as a guide with a corresponding curved marker. The guide device can comprise a single element or any number of elements to perform the guide function. The guide device can be arranged on the head, the flange, or partially on both.

In all the described embodiments, a dedicated marker pin 30 is not required, and another feature of the head 20 could be used to align with the guide plate 50.

Many further variations and modifications will suggest themselves to those versed in the art upon making reference to the foregoing illustrative embodiments, which are given by way of example only, and which are not intended to limit the scope of the invention, that being determined by the appended claims.

What is claimed is:

1. A lug type closure arrangement comprising a hub, a head adapted to be disengageable from said hub in a locked position to an unlocked position by a sequence of relative rotational and translational movements, a guide plate attached to the lug type closure arrangement to aid a user perform said sequence of relative rotational and translation movements, wherein the guide plate comprises a cascading, stepped profile comprising a first stepped portion and a second stepped portion, an arm coupled to the hub and the head, wherein the arm extends from the hub to the head and is connected to the head via a screw thread, and a rotatable handle connected to the screw thread, wherein the handle rotates to lift or lower the head on the screw thread.

2. A lug type closure arrangement according to claim 1, wherein said guide plate is attached to said hub and associated with a marker on said head, wherein said marker is adapted to align with predetermined positions of said guide plate at predetermined stages in said sequence of relative rotational and translational movements.

3. A lug type closure arrangement according to claim 2, wherein the marker comprises a radially outwardly projecting pin.

4. A method of opening a closure arrangement, the closure arrangement comprising a hub and a head adapted to be rotatable relative to the hub, an arm coupled to the hub and the head, wherein the arm extends from the hub to the head and is connected to the head via a screw thread, and a rotatable handle connected to the screw thread, wherein the handle rotates to lift or lower the head on the screw head the method comprising providing a guide plate to guide a user to perform a sequence of relative rotational and translation movements in order move the head from a locked to an unlocked position, wherein the guide plate comprises a cascading, stepped profile comprising a first stepped portion and a second stepped portion.

5. A method according to claim 4, wherein said guide plate is provided on said hub, further comprising providing a marker on said head, and aligning said marker with predetermined positions of said guide plate at predetermined stages in the opening sequence of said closure.

6. A method according to claim 5, further comprising using a radially outwardly projecting pin as said marker.

7. A closure arrangement comprising:

a hub comprising at least one first type of lug projecting from the hub;

a head adapted to be rotatable relative to said hub, the said head comprising at least one stepped second type of lug and at least one third type of lug projecting from said head, wherein the or each stepped second type of lug is situated adjacent a single third type of lug, wherein the or each stepped second type of lug is arranged to provide a stepped profile relative to the adjacent third type of lug, wherein said head is arranged to be in a first position when the or each stepped second type of lug and the or each third type of lug are arranged so as to not interfere with a corresponding first type of lug, wherein said head is arranged to be in a second position when the or each stepped second type of lug at least partially overlaps in an axially direction with a corresponding first type of lug, wherein said head is arranged to be in a third position when the or each stepped second type of lug contacts a corresponding first type of lug, and wherein said head is arranged to be in a fourth position when the or each stepped second type of lug and the or each third type of lug are arranged so as to at least partially overlap in an axial direction with a corresponding first type of lug;

a marker;

a guide plate having a stepped profile, wherein said marker and said guide plate are adapted to aid a user perform a sequence of relative rotational and translation movements that is required to move said head from the fourth position to the first position via the third and second positions, wherein the guide plate comprises a cascading stepped profile comprising a first stepped portion and a second stepped portion;

an arm coupled to the hub and the head, wherein the arm extends from the hub to the head and is connected to the head via a screw thread; and a rotatable handle connected to the screw thread, wherein the handle rotates to lift or lower the head on the screw head.

8. A closure arrangement according to claim 7, wherein said guide plate comprises a first portion, a stepped second portion, and a third portion.

9. A closure arrangement according to claim 8, wherein said marker is adapted to contact said first portion of said guide plate when the closure arrangement is in the third position, wherein said marker is adapted to be located just above said stepped second portion of said guide plate when the closure arrangement is in the second position, and wherein said marker is adapted to contact said second portion of said guide plate when the closure arrangement is in the first position.

10. A closure arrangement according to claim 9, wherein said guide plate is attached to said hub.

11. A closure arrangement according to claim 10, wherein said marker comprises a radially outwardly projecting pin attached to said head.

12. A closure arrangement according to claim 9, wherein said guide plate is attached to said head.

13. A closure arrangement according to claim 12, wherein said marker comprises a radially outwardly projecting pin attached to said hub.

14. A closure arrangement according to claim 8, wherein said guide plate is attached to said hub.

15. A closure arrangement according to claim 14, wherein said marker comprises a radially outwardly projecting pin attached to said head.

16. A closure arrangement according to claim 8, wherein said guide plate is attached to said head.

17. A closure arrangement according to claim 16, wherein said marker comprises a radially outwardly projecting pin attached to said hub.

18. A closure arrangement according to claim 7, wherein said guide plate is attached to said hub.

19. A closure arrangement according to claim 18, wherein said marker comprises a radially outwardly projecting pin attached to said head.

20. A closure arrangement according to claim 7, wherein said guide plate is attached to said head.

21. A closure arrangement according to claim 20, wherein said marker comprises a radially outwardly projecting pin attached to said hub.

22. A method of opening a closure arrangement according to claim 7, comprising;

rotating said head relative to said hub until there is contact between said marker and a first portion of said guide plate;

moving said head in an outer axial direction relative to said hub until said marker is located just away from a second stepped portion of said guide plate;

rotating said head relative to said hub until there is contact between said marker and a third portion of said guide plate; and moving said head in the outer axial direction relative to said hub until said head is separated from said hub.

* * * * *